US007153648B2

(12) United States Patent
Jing et al.

(10) Patent No.: US 7,153,648 B2
(45) Date of Patent: Dec. 26, 2006

(54) DIELECTROPHORETIC SEPARATION OF STAINED CELLS

(75) Inventors: Gaoshan Jing, Cincinnati, OH (US); Jian Zhang, Jiangsu (CN); Jing Cheng, Beijing (CN)

(73) Assignees: Capitalbio Corporation (CN); Tsinghua University (CN)

( * ) Notice: Subject to any disclaimer, the term of this patent is extended or adjusted under 35 U.S.C. 154(b) by 386 days.

(21) Appl. No.: 10/103,581

(22) Filed: Mar. 20, 2002

(65) Prior Publication Data

US 2002/0182654 A1 Dec. 5, 2002

(30) Foreign Application Priority Data

Mar. 22, 2001 (CN) ................................ 01 1 10015

(51) Int. Cl.
*A01N 1/02* (2006.01)

(52) U.S. Cl. .......................... 435/2; 435/366; 435/372; 435/173.1; 435/173.4; 435/173.5; 204/450; 204/547

(58) Field of Classification Search .................... 435/2, 435/366, 372, 173.1, 7.21, 40.5, 7.32, 7.31; 424/533, 528, 529; 204/547
See application file for complete search history.

(56) References Cited

U.S. PATENT DOCUMENTS

| | | | | |
|---|---|---|---|---|
| 3,975,156 A * | 8/1976 | Kraft et al. | 436/63 |
| 4,326,934 A | 4/1982 | Pohl | 204/180 |
| 5,641,628 A | 6/1997 | Bianchi | 435/6 |
| 5,653,859 A * | 8/1997 | Parton et al. | 204/450 |
| 5,814,200 A * | 9/1998 | Pethig et al. | 204/547 |
| 5,866,071 A | 2/1999 | Leu | 422/72 |
| 5,888,370 A | 3/1999 | Becker et al. | |
| 5,948,278 A | 9/1999 | Sammons et al. | 210/806 |
| 6,071,394 A * | 6/2000 | Cheng et al. | 204/547 |
| 6,596,143 B1 * | 7/2003 | Wang et al. | 204/547 |

FOREIGN PATENT DOCUMENTS

| | | |
|---|---|---|
| WO | WO-99/62622 | 12/1999 |
| WO | WO 02/16647 | 2/2002 |
| WO | WO-02/27909 | 4/2002 |
| WO | WO 02/28523 | 4/2002 |
| WO | WO 02/29400 | 4/2002 |

OTHER PUBLICATIONS

Shafer, J.A., “Hematology,” 1995, Churchill Livingstone, Hoffman et al (Eds.), 2nd Ed., pp. 2202-2203.*

Miale, J.B., “Laboratory Medicine: Hematology,” 1972, C.V. Mosby Company, 4th Ed., pp. 1208-1209.*

Cheng et al, “Isolation of cultured cervical carcinoma cells mixed with peripheral blood cells on a bioelectronic chip,” 1998, Anal. Chem., vol. 70, No. 11, pp. 2321-2326.*

Merriam-Webster Online Dictionary, 2004, www.m-w.com, accessed Jul. 28, 2004.*

Talary et al, “Electromanipulation and separation of cells using travelling electric fields,” J. Phys. D: Appl. Phys, 1996, vol. 29, pp. 2198-2203.*

Becker et al., Proc. Natl. Acad. Sci. USA (1995) 29:860-864.

Bianchi et al., Proc. Natl. Acad. Sci. USA (1990) 86:3279-3283.

Cheng et al., Nature Biotechnology (1998) 16(6):541-546.

Cheung et al., Nature Genetics (1996) 14:264-268.

Fuhr et al., Sensors and Materials (1995) 7:131-146.

Holzgreve et al., Journal of Reproductive Medicine (1992) 37(5):410-418.

Huang et al., Biochim. Biophys. Acta (1996) 1282-76-84.

Huang et al., Biophysical Journal (1997) 73:1118-1129.

Huang et al., J. Phys. D. Appl. Phys. (1993) 26:1528-1535.

Hughes et al., J. Phys. Appl. Phys. (1997) 29:474-482.

Muller, Biosensors & Bioelectronics (1999) 14:247-256.

Pethig, Critical Reviews in Biotechnology (1996) 16(4):331-348.

Simpson and Elias, Prenatal Diagnosis (1994) 14:1229-1242.

Wang et al., Biochim. Biophys. Acta (1995) 1243:185-194.

Wang et al., Biophys. J. (1997) 72:1887-1899.

Wang et al., J Phys. (1994) 27:1571-1574.

Williamson and Bob, Nature Genetics (1996) 14:239-240.

Chan et al., Biochimica et Biophysica Acta (2000) 1500(3):313-322.

Kuo and Guo, Obstetrics and Gynecology (1999) 94(3):464-468.

Mavrou et al., In Vivo (1998) 12(2):195-200.

Shafer et al., Hematology: Basic Principles and Practice, 2nd Edition, Churchill Livingstone, Edinburgh, Scotland (1995) pp. 2202-2209.

Supplementary Partial European Search Report for EP 02 72 8540, mailed on Apr. 4, 2005, 7 pages.

* cited by examiner

*Primary Examiner*—Leon B. Lankford, Jr.
*Assistant Examiner*—Allison M. Ford
(74) *Attorney, Agent, or Firm*—Morrison & Foerster LLP

(57) ABSTRACT

This invention relates generally to the field of cell separation or isolation. In particular, the invention provides a method for separating cells, which method comprises: a) selectively staining cells to be separated with a dye so that there is a sufficient difference in a separable property of differentially stained cells; and b) separating said differentially stained cells via said separable property. Preferably, the separable property is dielectrophoretic property of the differentially stained cells and the differentially stained cells are separated or isolated via dielectrophoresis. Methods for separating various types of cells in blood samples are also provided. Centrifuge tubes useful in density gradient centrifugation and dielectrophoresis isolation devices useful for separating or isolating various types of cells are further provided.

7 Claims, 3 Drawing Sheets

DIELECTROPHORETIC SEPARATION OF STAINED CELLS

RELATED APPLICATION

This application is related to the Chinese national patent application Serial No. 01110015.X, filed Mar. 22, 2001, entitled "CELL ISOLATION METHOD AND USES THEREOF." The disclosure of the above referenced patent application is incorporated by reference in their entirety.

TECHNICAL FIELD

This invention relates generally to the field of cell separation or isolation. In particular, the invention provides a method for separating cells, which method comprises: a) selectively staining cells to be separated with a dye so that there is a sufficient difference in a separable property of differentially stained cells; and b) separating said differentially stained cells via said separable property. Preferably, the separable property is dielectrophoretic property of the differentially stained cells and the differentially stained cells are separated or isolated via dielectrophoresis. Methods for separating various types of cells in blood samples are also provided. Centrifuge tubes useful in density gradient centrifugation and dielectrophoresis isolation devices useful for separating or isolating various types of cells are further provided.

BACKGROUND ART

Prenatal diagnosis began 30 years ago (See e.g., Williamson Bob, Towards Non-invasive Prenatal Diagnosis, *Nature Genetics,* 14:239–240 (1996)). Now, prenatal diagnosis has become a very promising field. Currently, fetal cells are obtained by using amniocentesis or chorionic villus sampling (CVS). Amniocentesis is the removal of amniotic fluid via a needle inserted through the maternal abdomen into the uterus and amniotic sac. CVS is performed during weeks 10–11 of pregnancy, and is performed either transabdominally or transcervically, depending on where the placenta is located; if it is on the front, a transabdominal approach can be used. CVS involves inserting a needle (abdominally) or a catheter (cervically) into the substance of the placenta but keeping it from reaching the amniotic sac. Then suction is applied with a syringe, and about 10–15 milligrams of tissue are aspirated into the syringe. The tissue is manually cleaned of maternal uterine tissue and then grown in culture. A karyotype is made in the same way as amniocentesis. Amniocentesis and chorionic villus sampling each increases the frequency of fetal loss. For amniocentesis, the possibility is about 0.5%, while for CVS, it is about 1.5% (U.S. Pat. No. 5,948,278; and Holzgreve et al., Fetal Cells In the Maternal Circulation, *Journal of Reproductive Medicine,* 37(5):410–418 (1992)). Therefore, they are offered mostly to women who have reached the age of 35 years, for whom the risk of bearing a child with an abnormal karyotype is comparable to the procedure-related risk.

Because of the uncertainties of the procedure-induced risks of amniocentesis and CVS, there is considerable interest in developing noninvasive methods for the information of gestating fetus. The existence of fetal cells in the maternal circulation has been the topic of considerable research and testing over many years. It is now understood that there are three principal types of fetal cells: lymphocytes, trophoblasts and nucleated fetal erythrocytes. (Simpson and Elias, Isolating Fetal Cells in Maternal Circulation for Prenatal Diagnosis, *Prenatal Diagnosis,* 14:1229–1242 (1994); Cheung et al., Prenatal Diagnosis of Sickle Cell Anaemia and Thalassaemia by Analysis of Fetal Cells in Maternal Blood, *Nature Genetics,* 14:264–268 (1996); Bianchi et al., Isolation of Fetal DNA from Nucleated Erythrocytes in Maternal Blood, *Proc. Natl. Acad. Sci. USA,* 86:3279–3283 (1990); and U.S. Pat. No. 5,641,628). Various proposals have been made for the isolation or enrichment of one of these cell types from a maternal blood sample, and it has been proposed to use these isolated or enriched cells for testing for chromosomal abnormalities. Trophoblasts are the largest cells of the three types of cells. But they have not found widespread application in separation studies because they are degraded in the maternal lung when they first enter the maternal circulation. Because fetal lymphocytes can survive quite a while in maternal blood, false diagnosis is possible due to carry over of lymphocytes from previous fetus. Nucleated red blood cells (NRBC) are the most common cells in fetal blood during early pregnancy. The separation methods that have been tested so far are fluorescence-activated cell sorting (FACS), magnetic-activated cell sorting (MACS), charge flow separation (CFS) and density gradient centrifuge. All of these methods result in the enrichment of fetal cells from a large population of maternal cells. They do not enable recovery of pure populations of fetal cells (Cheung et al., *Nature Genetics,* 14:264–268 (1996)).

There are two reasons for the difficulty. First, there are very few fetal NRBC in maternal blood although the number is high comparing to fetal trophoblasts and fetal lymphocytes. In maternal blood, the ratio between nucleated cells and fetal NRBC is $4.65\times10^6$~$6\times10^6$. About 7~22 fetal NRBC can be obtained from 20 ml maternal blood by MACS (Cheung et al., *Nature Genetics,* 14:264–268 (1996)). Second, there is little difference between fetal NRBC and maternal cells. For fetal NRBC and maternal NRBC, the only difference between them is that there are specific hemoglobin $\gamma$ and hemoglobin $\zeta$ in fetal NRBC.

Various techniques in a variety of fields, such as biology, chemistry and clinical diagnosis have been applied to cell separation. With these techniques, differences between cell types are exploited to isolate a particular type of cells. These differences include cell surface properties, and physical and functional difference between cell populations. In some cases, the difference between cell types is very trivial and it is very hard to separate them by current available techniques.

There exists a need in the art for a new process and device for cell separation and isolation. This invention address this and other related needs in the art.

DISCLOSURE OF THE INVENTION

In one aspect, the present invention is directed to a method for separating cells, which method comprises: a) selectively staining cells to be separated with a dye so that there is a sufficient difference in a separable property of differentially stained cells; and b) separating said differentially stained cells via said separable property. Preferably, the separable property is dielectrophoretic property of the differentially stained cells and the differentially stained cells are separated or isolated via dielectrophoresis.

In another aspect, the present invention is directed to a method to isolate nucleated red blood cells (NRBC) from a maternal blood sample, which method comprises: a) selectively staining at least one type of cells in a maternal blood sample with a dye so that there is a sufficient difference of dielectrophoretic property of differentially stained cells; and b) isolating fetal NRBC cells from said maternal blood sample via dielectrophoresis.

In still another aspect, the present invention is directed to a method to separate red blood cells from white blood cells, which method comprises: a) preparing a sample comprising red blood cells and white blood cells in a buffer; b) selectively staining said red blood cells and/or said white blood cells in said prepared sample so that there is a sufficient difference of dielectrophoretic property of differentially stained cells; c) separating said red blood cells from said white blood cells via dielectrophoresis.

In yet another aspect, the present invention is directed to a centrifuge tube useful in density gradient centrifugation, which centrifuge tube's inner diameter in the middle portion of said tube is narrower than diameters at the top and bottom portion of said tube.

In yet another aspect, the present invention is directed to a dielectrophoresis isolation device, which device comprises two dielectrophoresis chips, a gasket, a signal generator and a pump, wherein said gasket comprises channels and said gasket lies between said two dielectrophoresis chips, and said dielectrophoresis chips, said gasket and said pump are in fluid connection.

MODES OF CARRYING OUT THE INVENTION

Figure 1A:
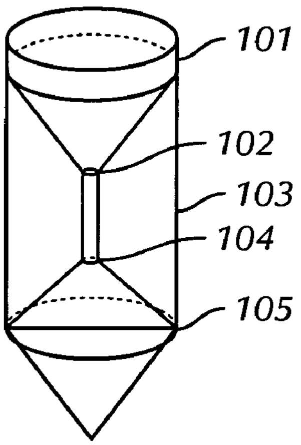
FIG. 1 illustrates an exemplary centrifuge tube useful in density gradient centrifugation.

For clarity of disclosure, and not by way of limitation, the detailed description of the invention is divided into the subsections that follow.

A. Definitions

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, “a” or “an” means “at least one” or “one or more.”

As used herein, “chip” refers to a solid substrate with a plurality of one-, two- or three-dimensional micro structures or micro-scale structures on which certain processes, such as physical, chemical, biological, biophysical or biochemical processes, etc., can be carried out. The micro structures or micro-scale structures such as, channels and wells, electrode elements, electromagnetic elements, are incorporated into, fabricated on or otherwise attached to the substrate for facilitating physical, biophysical, biological, biochemical, chemical reactions or processes on the chip. The chip may be thin in one dimension and may have various shapes in other dimensions, for example, a rectangle, a circle, an ellipse, or other irregular shapes. The size of the major surface of chips used in the present invention can vary considerably, e.g., from about 1 $mm^2$ to about 0.25 $m^2$. Preferably, the size of the chips is from about 4 $mm^2$ to about 25 $cm^2$ with a characteristic dimension from about 1 mm to about 7.5 cm. The chip surfaces may be flat, or not flat. The chips with non-flat surfaces may include channels or wells fabricated on the surfaces. One example of a chip is a solid substrate onto which multiple types of DNA molecules or protein molecules or cells are immobilized.

As used herein, “medium (or media)” refers to a fluidic carrier, e.g., liquid or gas, wherein cells are dissolved, suspended or contained.

As used herein, “microfluidic application” refers to the use of microscale devices, e.g., the characteristic dimension of basic structural elements is in the range between less than 1 micron to 1 cm scale, for manipulation and process in a fluid-based setting, typically for performing specific biological, biochemical or chemical reactions and procedures. The specific areas include, but are not limited to, biochips, i.e., chips for biologically related reactions and processes, chemchips, i.e., chips for chemical reactions, or a combination thereof. The characteristic dimensions of the basic elements refer to the single dimension sizes. For example, for the microscale devices having circular shape structures (e.g. round electrode pads), the characteristic dimension refers to the diameter of the round electrodes. For the devices having thin, rectangular lines as basic structures, the characteristic dimensions may refer to the width or length of these lines.

As used herein, “micro-scale structures” mean that the structures have characteristic dimension of basic structural elements in the range from about 1 micron to about 20 mm scale.

As used herein, “plant” refers to any of various photosynthetic, eucaryotic multi-cellular organisms of the kingdom Plantae, characteristically producing embryos, containing chloroplasts, having cellulose cell walls and lacking locomotion.

As used herein, “animal” refers to a multi-cellular organism of the kingdom of Animalia, characterized by a capacity for locomotion, nonphotosynthetic metabolism, pronounced response to stimuli, restricted growth and fixed bodily structure. Non-limiting examples of animals include birds such as chickens, vertebrates such fish and mammals such as mice, rats, rabbits, cats, dogs, pigs, cows, ox, sheep, goats, horses, monkeys and other non-human primates.

As used herein, “bacteria” refers to small prokaryotic organisms (linear dimensions of around 1 micron) with non-compartmentalized circular DNA and ribosomes of about 70S. Bacteria protein synthesis differs from that of eukaryotes. Many anti-bacterial antibiotics interfere with bacteria proteins synthesis but do not affect the infected host.

As used herein, “eubacteria” refers to a major subdivision of the bacteria except the archaebacteria. Most Gram-positive bacteria, cyanobacteria, mycoplasmas, enterobacteria, pseudomonas and chloroplasts are eubacteria. The cytoplasmic membrane of eubacteria contains ester-linked lipids; there is peptidoglycan in the cell wall (if present); and no introns have been discovered in eubacteria.

As used herein, "archaebacteria" refers to a major subdivision of the bacteria except the eubacteria. There are three main orders of archaebacteria: extreme halophiles, methanogens and sulphur-dependent extreme thermophiles. Archaebacteria differs from eubacteria in ribosomal structure, the possession (in some case) of introns, and other features including membrane composition.

As used herein, "fungus" refers to a division of eucaryotic organisms that grow in irregular masses, without roots, stems, or leaves, and are devoid of chlorophyll or other pigments capable of photosynthesis. Each organism (thallus) is unicellular to filamentous, and possesses branched somatic structures (hyphae) surrounded by cell walls containing glucan or chitin or both, and containing true nuclei.

As used herein, "sample" refers to anything which may contain cells to be separated or isolated using the present methods and/or devices. The sample may be a biological sample, such as a biological fluid or a biological tissue. Examples of biological fluids include urine, blood, plasma, serum, saliva, semen, stool, sputum, cerebral spinal fluid, tears, mucus, amniotic fluid or the like. Biological tissues are aggregates of cells, usually of a particular kind together with their intercellular substance that form one of the structural materials of a human, animal, plant, bacterial, fungal or viral structure, including connective, epithelium, muscle and nerve tissues. Examples of biological tissues also include organs, tumors, lymph nodes, arteries and individual cell(s). Biological tissues may be processed to obtain cell suspension samples. The sample may also be a mixture of cells prepared in vitro. The sample may also be a cultured cell suspension. In case of the biological samples, the sample may be crude samples or processed samples that are obtained after various processing or preparation on the original samples. For example, various cell separation methods (e.g., magnetically activated cell sorting) may be applied to separate or enrich target cells from a body fluid sample such as blood. Samples used for the present invention include such target-cell enriched cell preparation.

As used herein, a "liquid (fluid) sample" refers to a sample that naturally exists as a liquid or fluid, e.g., a biological fluid. A "liquid sample" also refers to a sample that naturally exists in a non-liquid status, e.g., solid or gas, but is prepared as a liquid, fluid, solution or suspension containing the solid or gas sample material. For example, a liquid sample can encompass a liquid, fluid, solution or suspension containing a biological tissue.

B. Methods for Separating Cells

In one aspect, the present invention is directed to a method for separating cells, which method comprises: a) selectively staining cells to be separated with a dye so that there is a sufficient difference in a separable property of differentially stained cells; and b) separating said differentially stained cells via said separable property.

The difference in the separable property of the differentially stained cells should be sufficiently large so that differentially stained cells can be separated from each other or isolated from a sample based on the difference in the separable property. The difference can be in kind, e.g., some cells are stained while other cells are not stained. The difference can also be in degree, e.g., some cells are stained more while other cells are stained less.

Any suitable separable property can be used in the present method. For example, different shapes of differentially stained cells can be used to separate or isolate these cells.

In a preferred embodiment, the present invention is directed to a method for separating cells using dielectrophoresis, which method comprises: a) selectively staining cells to be separated with a dye so that there is a sufficient difference of dielectrophoretic property of differentially stained cells; and b) separating said differentially stained cells via dielectrophoresis.

The difference in the dielectrophoretic property of the differentially stained cells should be sufficiently large so that differentially stained cells can be separated from each other or isolated from a sample based on the difference in the dielectrophoretic property. The difference can be in kind, e.g., some cells are stained while other cells are not stained or some cells are stained to be reactive to positive dielectrophoresis while other cells are stained to be reactive to negative dielectrophoresis. The difference can also be in degree, e.g., some cells are stained to be more reactive while other cells are stained to be less reactive to same kind of dielectrophoresis.

The present methods can be used to separate or isolate any types of cells. For example, the present methods can be used to separate or isolate animal cells, plant cells, fungus cells, bacterium cells, recombinant cells or cultured cells.

Cells to be separated or isolated can be stained under any suitable conditions. For example, cells can be stained in solid or liquid state. Preferably, cells are stained in liquid without being immobilized.

The present methods can be used to separate different types of cells from each other. For example, the present methods can be used to separate two or more different types of cells.

The present methods can be used to isolate interested cells from a sample. In one specific embodiment, the present methods are used to separate or isolate cells having identical or similar dielectrophoretic property to other cells in the sample before staining. In another specific embodiment, the present methods are used to separate or isolate cells having identical or similar dielectrophoretic property before staining and the staining is conducted under suitable dye concentration and staining time conditions so that cells with identical or similar dielectrophoretic property absorb the dye differentially. Preferably, the staining is controlled so that at least one type of cells is stained and at least another type of cells is not stained.

Any suitable staining method or dye can be used in the present methods. For example, Giemsa, Wright, Romannowsky, Kleihauser-Betke staining and a combination thereof, e.g., Wright-Giemsa staining, can be used in the present methods. Preferably, Giemsa staining is used.

Any suitable dielectrophoresis can be used in the present methods. For example, conventional dielectrophoresis or traveling wave dielectrophoresis can be used in the present methods.

Although not to be bound by the principles described below, the following principles of dielectrophoresis(DEP) forces may be used in the present methods or devices as well as methods described in the following Sections C and D. DEP forces on a particle result from a non-uniform distribution of an AC electric field to which the particle is subjected. In particular, DEP forces arise from the interaction between an electric field induced polarization charge and a non-uniform electric field. The polarization charge is induced in particles by the applied field, and the magnitude and direction of the resulting dipole is related to the difference in the dielectric properties between the particles and medium in which the particles are suspended.

DEP forces may be either traveling-wave dielectrophoresis (twDEP) forces or conventional dielectrophoresis (cDEP) forces. A twDEP force refers to the force generated on a particle or particles which arises from a traveling-wave electric field. The traveling-wave electric field is characterized by AC electric field components which have non-uniform distributions for phase values. On the other hand, a cDEP force refers to the force that is generated on a particle or particles which arises from the non-uniform distribution of the magnitude of an AC electric field. The origin of twDEP and cDEP forces is described in more detail below (Huang et al., Electrokinetic behavior of colloidal particles in travelling electric fields: studies using yeast cells, *J. Phys. D: Appl. Phys.*, 26:1528–1535 (1993); Wang et al., A unified theory of dielectrophoresis and travelling-wave dielectrophoresis, *J. Phys. D: Appl. Phys.*, 27:1571–1574 (1994); Wang et al., Dielectrophoretic Manipulation of Cells Using Spiral Electrodes, Biophys. J., 72:1887–1899 (1997); X-B. Wang et al., Dielectrophoretic manipulation of particles, *IEEE/IAS Trans.*, 33:660–669 (1997); Fuhr et al., Positioning and manipulation of cells and microparticles using miniaturized electric field traps and travelling waves, *Sensors and Materials*, 7:131–146 (1995); and Wang et al., Non-uniform spatial distributions of both the magnitude and phase of AC electric fields determine dielectrophoretic forces, *Biochim Biophys Acta*, 1243:185–194 (1995)).

An electric field of a single harmonic component may in general be expressed in the time-domain as $$\vec{E}(t) = \sum_{\alpha=x;y;z} E_{\alpha 0}\cos(2\pi f t + \varphi_\alpha)\vec{a}_\alpha, \quad (1)$$

where $\vec{\alpha}_\alpha$ ($\alpha$=x, y, z) are the unit vectors in a Cartesian coordinate system, and $E_{\alpha 0}$ and $\phi_\alpha$ are the magnitude and phase, respectively, of the three field components. When a particle such as a cell is subjected to a non-uniform electric field (note that $E_{\alpha 0}$ and/or $\phi_\alpha$ vary with position), a net dielectrophoretic force is exerted on the particle because of the electric interaction between the field and the field-induced dipole moment in the particle. The DEP force is given by Wang et al. (Wang et al., A unified theory of dielectrophoresis and travelling-wave dielectrophoresis, *J. Phys. D: Appl. Phys.*, 27:1571–1574 (1994)):

$$\vec{F}_{DEP}=2\pi\epsilon_m r^3(Re(f_{CM})\nabla E_{rms}^2+Im(f_{CM})(E_{x0}^2\nabla\phi_x+E_{y0}^2\nabla\phi_y+E_{z0}^2\nabla\phi_z)), \quad (2)$$

where r is the particle radius, $\epsilon_m$ is the dielectric permittivity of the particle suspending medium, and $E_{rms}$ is the field RMS magnitude. The factor $f_{CM}=(\epsilon_p^*-\epsilon_m^*)/(\epsilon_p^*+2\epsilon_m^*)$ is the dielectric polarization factor (the so-called Clausius-Mossotti factor). The complex permittivity is defined as $\epsilon_x^*=\epsilon_x-j\sigma_x/(2\pi f)$. The dielectric polarization factor depends on the frequency f of the applied field, conductivity $\sigma_x$, and permittivity $\epsilon_x$ of the particle (denoted by p) and its suspending medium (denoted by m).

As shown in Equation (2), dielectrophoretic (DEP) forces generally have two components, i.e., conventional DEP (cDEP) and traveling-wave DEP (twDEP) forces. The CDEP forces are associated with the in-phase component of the field-induced polarization (reflected by the term $Re(f_{CM})$, i.e., the real part of the factor $f_{CM}$, which is the conventional DEP polarization factor) interacting with the gradient of the field magnitude ($\nabla E_{rms}^2$). The traveling-wave DEP forces are associated with the out-of-phase component of the field-induced polarization (reflected by the term $Im(f_{CM})$, i.e., the imaginary part of the factor $f_{CM}$, which is the twDEP polarization factor) interacting with the gradient of the field phases ($\nabla\phi_x$, $\nabla\phi_y$ and $\nabla\phi_z$). It is worthwhile to point out that an electrical field having non-uniform distribution of phase values of the field components is a traveling electric field. The field travels in the direction of decreasing phase values with positions. An ideal traveling electric field (see below) has a phase distribution that is a linear function of the position along the traveling direction of the field. Thus, the cDEP force refers to the force generated on a particle or particles due to a non-uniform distribution of the magnitude of an AC electric field. Although the conventional DEP force is sometimes referred to in the literature as simply the DEP force, this simplification in terminology is avoided herein (Wang et al., A unified theory of dielectrophoresis and travelling-wave dielectrophoresis, *J. Phys. D: Appl. Phys.*, 27:1571–1574 (1994); Wang et al., Non-uniform spatial distributions of both the magnitude and phase of AC electric fields determine dielectrophoretic forces, *Biochim Biophys Acta*, 1243:185–194 (1995); Wang et al., Dielectrophoretic manipulation of particles, *IEEE/IAS Trans.*, 33:660–669 (1997); and Wang et al., Dielectrophoretic Manipulation of Cells Using Spiral Electrodes, *Biophys. J.*, 72:1887–1899 (1997)).

The cDEP force $\vec{F}_{cDEP}$ acting on a particle of radius r subjected to an electrical field of non-uniform magnitude is given by $$\vec{F}_{cDEP}=2\pi\epsilon_m r^3\chi_{DEP}\nabla E_{rms}^2 \quad (3)$$

where $E_{rms}$ is the RMS value of the field strength, and $\epsilon_m$ is the dielectric permittivity of the medium. Equation (3) for a cDEP force is consistent with the general expression of DEP forces utilized above. The factor $\chi_{cDEP}$ is the particle cDEP polarization factor, given by $$\chi_{cDEP} = \mathrm{Re}\left(\frac{\varepsilon_p^* - \varepsilon_m^*}{\varepsilon_p^* + 2\varepsilon_m^*}\right) \quad (4)$$

Here "Re" refers to the real part of the "complex number". The symbol $\epsilon_x^*=\epsilon_x-j\sigma_x/(2\pi f)$ is the complex permittivity. The parameters $\epsilon_p$ and $\sigma_p$ are the effective permittivity and conductivity of the particle, respectively, and may be frequency dependent. For example, a typical biological cell will have frequency dependent conductivity and permittivity, which arises at least in part because of cytoplasm membrane polarization (Membrane changes associated with the temperature-sensitive P85 gag-mos -dependent transformation of rat kidney cells as determined from dielectrophoresis and electrorotation, Huang et al, *Biochim. Biophys. Acta*, 1282:76–84 (1996); and Becker et al., Separation of human breast cancer cells from blood by differential dielectric affinity, *Proc. Nat. Acad. Sci.* (*USA*), 29:860–864 (1995)).

The above equation for the conventional DEP force can also be written as $$\vec{F}_{cDEP}=2\pi\epsilon_m r^3\chi_{cDEP}\,V^2\,(\nabla_p) \quad (5)$$

where p=p(x,y,z) is the square-field distribution for a unit-voltage excitation (Voltage V=1 V) on the electrodes, and V is the applied voltage.

When a particle exhibits a positive cDEP polarization factor ($\chi_{cDEP}>0$), the particle is moved by cDEP forces towards the strong field regions. This is called positive cDEP. The cDEP force that causes the particles undergo positive cDEP is positive cDEP force. When a particle exhibits a negative cDEP polarization factor ($\chi_{cDEP}<0$), the particle is moved by cDEP forces away from the strong field regions and towards the weak field regions. The cDEP force that causes the particles undergo negative cDEP is negative cDEP force.

The twDEP force $F_{twDEP}$ for an ideal traveling wave field acting on a particle of radius r and subjected to a traveling-wave electrical field $E_{twDEP}=E\cos(2\pi(ft)-/z/\lambda_0)\vec{a}_x$ (i.e., the x-component of an E-field traveling in the z-direction, the phase value of the field x-component is a linear function of the position along the z-direction) is given by $$F_{TWDEP}=-\frac{4\pi^2\varepsilon_m}{\lambda}r^3\zeta_{TWD}E^2\cdot\vec{a}_z \tag{6}$$

where E is the magnitude of the field strength, and $\epsilon_m$ is the dielectric permittivity of the medium. $\zeta_{twDEP}$ is the particle twDEP polarization factor, and is given by $$\zeta_{twDEP}=\mathrm{Im}\left(\frac{\varepsilon_p^*-\varepsilon_m^*}{\varepsilon_p^*+2\varepsilon_m^*}\right) \tag{7}$$

Here "Im" refers to the imaginary part of the corresponding complex number. The symbol $\epsilon_x^*=\epsilon_x-j\sigma_x/(2\pi f)$ is the complex permittivity. The parameters $\epsilon_p$ and $\sigma_p$ are the effective permittivity and conductivity of the particle, respectively, and may be frequency dependent.

Thus, the traveling-wave force component of a DEP force acts on a particle in a direction that is either oriented with or against that of the direction of propagation of the traveling-wave field, depending upon whether the twDEP polarization factor is negative or positive, respectively. If a particle exhibits a positive twDEP-polarization factor ($\zeta_{TWD}>0$) at the frequency of operation, the twDEP force will be exerted on the particle in a direction opposite that of the direction in which the electric field travels. On the other hand, if a particle exhibits a negative twDEP-polarization factor ($\zeta$TWD<0) at the frequency of operation, the twDEP force will be exerted on the particle in the same direction in which the electric field travels. For traveling-wave DEP manipulation of particles (including biological cells), traveling-wave DEP forces acting on a particle having a diameter of 10 microns are on the order of 0.01 to 10000 pN.

For dielectrophoresis, good separation result can be obtained only when there is large difference between cells' dielectric properties, such as blood cells and *E.coli.* cells, viable yeast cells and dead yeast cells (Cheng et al, Preparation and Hybridization Analysis of DNA/RNA from *E. coli* on Microfabricated Bioelectronic Chips, *Nature Biotechnology,* 16(6):541–546 (1998); and Pethig, Dielectrophoresis: Using Inhomogeneous AC Electrical Fields to Separate and Manipulate Cells, *Critical Reviews in Biotechnology,* 16(4):331–348 (1996)). For cells with similar dielectric properties, it is hard to get good separation result. Although dielectrophoresis and field flow fractionation or conventional dielectrophoresis and traveling wave dielectrophoresis can be applied together to get better separation, it is hard to separate fetal NRBC, maternal NRBC and maternal lymphocytes which have very similar dielectric properties (Huang et al, Introducing Dielectrophoresis as a New Force Field for Field Flow Fractionation, *Biophysical Journal,* 73:1118–1129 (1997); and Wang et al, Dielectrophretic Manipulation of Cells with Spiral Electrodes, *Biophysical Journal,* 72:1887–1899 (1997)) without increasing the difference of dielectrophoretic property among these cells.

The separation or isolation can be used in any suitable format. For example, the separation or isolation can be conducted in a chip format. Any suitable chips can be used in the present methods. For example, a conventional dielectrophoresis chip, a traveling wave dielectrophoresis chip or a particle switch chip based on traveling wave dielectrophoresis can be used in any suitable format. Preferably, the particle switch chip used in the present methods comprises multi-channel particle switches.

Alternatively, the separation or isolation can be conducted in a non-chip format. For example, the separation or isolation can be conducted in a liquid container such as a beaker, a flask, a cylinder, a test tube, an enpindorf tube, a centrifugation tube, a culture dish, a multiwell plate and a filter membrane.

Cells should be stained for a sufficient amount of time, e.g., from about 10 seconds to about 10 minutes, or at least 30 minutes or longer.

The present method can further comprise collecting the separated or isolated cells from the, chip or liquid container. The separated or isolated cells can be collected from the chip or liquid container by any suitable methods, e.g., via an external pump.

C. Methods for Separating Cells

In another aspect, the present invention is directed to a method to isolate nucleated red blood cells (NRBC) from a maternal blood sample, which method comprises: a) selectively staining at least one type of cells in a maternal blood sample with a dye so that there is a sufficient difference of dielectrophoretic property of differentially stained cells; and b) isolating fetal NRBC cells from said maternal blood sample via dielectrophoresis.

The present methods can be used to isolate any NRBC, e.g., maternal NRBC and/or fetal NRBC, from the maternal blood sample. Preferably, the present methods can be further used to separate maternal NRBC from fetal NRBC.

The present method can further comprise substantially removing red blood cells from the maternal blood sample, e.g., removing at least 50%, 60%, 70%, 80%, 90%, 95% 99% or 100% of red blood cells, before selectively staining at least one type of cells.

The maternal blood sample is added into suitable buffer, preferably, isotonic buffer, before selectively staining at least one type of cells. In one example, the maternal blood sample is added into an isosmotic or isotonic glucose buffer before selectively staining at least one type of cells. The glucose buffer can have any suitable conductivity, e.g., ranging from about 10 µs/cm to about 1.5 ms/cm.

Any suitable staining method or dye can be used in the present methods. For example, Giemsa, Wright, Romannowsky, Kleihauser-Betke staining and a combination thereof, e.g., Wright-Giemsa staining, can be used in the present methods. Preferably, Giemsa staining is used. The dye, e.g., Giemsa dye, can be used at any suitable concentration. For example, the ratio of Giemsa dye to buffer can range from about 1:5 (v/v) to about 1:500 (v/v). In a preferred embodiment, the dye binds specifically to fetal hemoglobin.

The separation or isolation can be used in any suitable format. For example, the separation or isolation can be conducted in a chip format. Any suitable chips can be used in the present methods. For example, a conventional dielectrophoresis chip, a traveling wave dielectrophoresis chip or a particle switch chip based on traveling wave dielectrophoresis can be used in any suitable format. Preferably, the particle switch chip used in the present methods comprises multi-channel particle switches. In a specific embodiment, the maternal white blood cells are captured on an electrode of the chip and stained NRBC are repulsed to a place where electrical field is the weakest on the chip. In another specific embodiment, a chip comprising multi-channel particle switches is used to isolate and detect maternal red blood cells, maternal white blood cells, maternal NRBC and fetal NRBC in parallel.

Alternatively, the separation or isolation can be conducted in a non-chip format. For example, the separation or isolation can be conducted in a liquid container such as a beaker, a flask, a cylinder, a test tube, an enpindorf tube, a centrifugation tube, a culture dish, a multiwell plate and a filter membrane.

Any single type or multiples types of cells can be isolated from maternal blood sample according to the present methods. When multiple types of cells are isolated from a maternal blood sample, the multiple types of cells can be isolated from the maternal blood sample sequentially or simultaneously. In one example, the maternal blood sample is subjected to multiple isolation via dielectrophoresis to isolate different types of cells sequentially.

Cells should be stained for a sufficient amount of time, e.g., from about 10 seconds to about 10 minutes, or 30 minutes or longer.

In still another aspect, the present invention is directed to a method to separate red blood cells from white blood cells, which method comprises: a) preparing a sample comprising red blood cells and white blood cells in a buffer; b) selectively staining said red blood cells and/or said white blood cells in said prepared sample so that there is a sufficient difference of dielectrophoretic property of differentially stained cells; c) separating said red blood cells from said white blood cells via dielectrophoresis.

Any suitable staining method or dye can be used in the present methods. For example, Giemsa, Wright, Romannowsky, Kleihauser-Betke staining and a combination thereof, e.g., Wright-Giemsa staining, can be used in the present methods. Preferably, Giemsa staining is used. The dye, e.g., Giemsa dye, can be used at any suitable concentration. For example, the ratio of Giemsa dye to buffer can range from about 1:5 (v/v) to about 1:500 (v/v).

Cells should be stained for a sufficient amount of time, e.g., from about 10 seconds to about 10 minutes. Preferably, the red blood cells and/or the white blood cells are stained for at least 30 minutes or longer.

The separation or isolation can be used in any suitable format. For example, the separation or isolation can be conducted in a chip format. Any suitable chips can be used in the present methods. For example, a conventional dielectrophoresis chip, a traveling wave dielectrophoresis chip or a particle switch chip based on traveling wave dielectrophoresis can be used in any suitable format. Preferably, the particle switch chip used in the present methods comprises multi-channel particle switches. In a specific embodiment, the red blood cells are subjected to positive dielectrophoresis and are captured on an electrode of the chip and the stained white blood cells are subjected to negative dielectrophoresis and are repulsed to a place where electrical field is the weakest.

The present method can further comprise collecting red and/or white blood cells from the chip. The separated red and/or white blood cells can be collected from the chip by any suitable methods, e.g., via an external pump.

Alternatively, the separation or isolation can be conducted in a non-chip format. For example, the separation or isolation can be conducted in a liquid container such as a beaker, a flask, a cylinder, a test tube, an enpindorf tube, a centrifugation tube, a culture dish, a multiwell plate and a filter membrane.

D. Centrifuge Tubes and Dielectrophoresis Isolation Devices

In still another aspect, the present invention is directed to a centrifuge tube useful in density gradient centrifugation, which centrifuge tube's inner diameter in the middle portion of said tube is narrower than diameters at the top and bottom portion of said tube. The centrifuge tube can be made of any suitable materials, e.g., polymers, plastics or other suitable composite materials.

In yet another aspect, the present invention is directed to a dielectrophoresis isolation device, which device comprises two dielectrophoresis chips, a gasket, a signal generator and a pump, wherein said gasket comprises channels and said gasket lies between said two dielectrophoresis chips, and said dielectrophoresis chips, said gasket and said pump are in fluid connection. The pump can be connected with the dielectrophoresis chip(s) in any suitable manner. In one specific embodiment, there are two tubings in the external pump. One is inlet and the other is outlet. Inlet of the pump is connected with the inlet of the dielectrophoresis chip and outlet of the pump is connected with the outlet of the dielectrophoresis chip.

One or both of the dielectrophoresis chips can be connected with an input port and/or an output port. Similarly, one or both of the dielectrophoresis chips are connected with multiple input and/or output ports. In one example, the dielectrophoresis chip above the gasket is connected with an input port and/or an output port.

The channels on the gasket can have any suitable shapes. Preferably, the shapes of channels on the gasket correspond to the shapes of electrodes on the dielectrophoresis chips. The channels on the gasket can have any suitable diameters. Preferably, the diameter of the channels within electrodes' effecting area is wider than the diameter of the channels outside the electrodes' effecting area.

D. Exemplary Embodiments

In one specific embodiment, sample cells are first stained to amplify the difference in dielectric properties. Then a dielectrophoresis chip is applied to enrich and purify fetal NRBC for quick, convenient and precise prenatal diagnosis. The procedures are as follows:

First, maternal blood from a pregnant woman is processed by density gradient centrifugation in order to remove most of the red blood cells. Density gradient centrifugation is a conventional biological and medical method to separate different types of cells. There are different density values for plasma and various blood cells. When blood samples are centrifuged in a Ficoll medium, cells with different density will separate into different layers. NRBC and lymphocytes will be in the same layer since they have similar density.

Figure 1B:
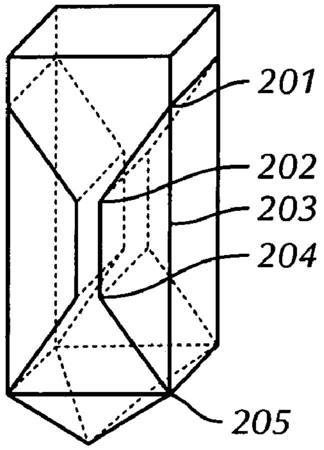
Figure 2A:
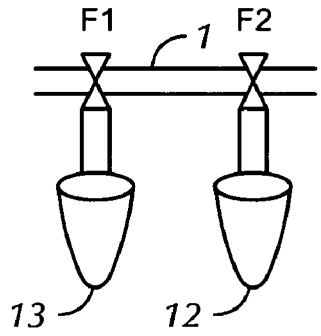
FIG. 2 illustrates an exemplary dielectrophoresis isolation device.
Figure 2B:
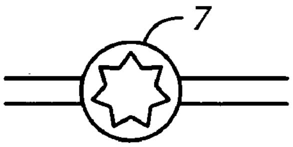
Figure 2C:
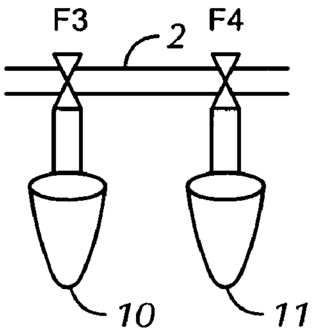
Figure 2D:
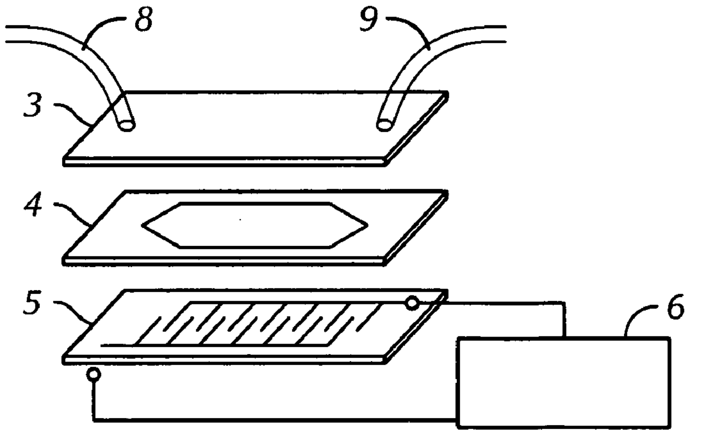
Figure 3:
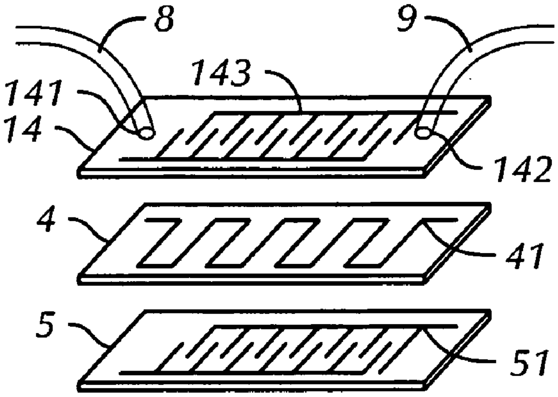
FIG. 3 illustrates the dielectrophoresis chips and the gasket and their connections in the dielectrophoresis isolation device in FIG. 2.

After density gradient centrifuge, four layers are formed in Ficoll. Red blood cells will be at the bottom, followed by granulocytes, the complex of lymphocytes and NRBC, and plasma. What we need is the complex of lymphocytes and NRBC. When operated with conventional centrifuge tube, there will be significant loss of target cells because only a few lymphocytes and NRBC anchor in the middle layer of the tube. To increase the efficiency of enrichment, a specifically designed centrifuge tube shown in FIG. 1A and FIG. 1B can be used. The centrifuge tube can be designed either as a cylinder shape shown in FIG. 1A, or as a rectangular shape shown in FIG. 1B. To get the best enrichment result, it is necessary to perform a preliminary experiment to decide the dimensions of the tube. For example, a cylinder tube is designed as shown in FIG. 1A. The volume of the cone 105 at the bottom equals to that of red blood cells and granulocytes. For the thin cylinder part 103 at the middle, the volume equals to that of lymphocytes and NRBC. This way there is only plasma at the top of the tube. The separation efficiency will be increased substantially because the diameter of the middle part is very small, and it is easy to distinguish different layers at the interface 101 and 104. Shown in FIG. 1B, the middle part 203 can be designed as a thin rectangular slit. The bottom part 201 and the top part 205 are designed as triangles. The interfaces 202 and 204 are very small so as to increase separation efficiency. To further improve separation efficiency, fast freeze with liquid nitrogen guns can be applied to boundaries of the middle portion with the top and bottom portion. The top layer and frozen part is first removed before the middle layer is collected.

After centrifugation twice and buffer washing, the sample containing fetal NRBC, maternal NRBC, maternal lymphocytes, granulocytes and maternal red blood cells is preserved in maternal plasma. Researcher in this field should know that there are other ways to remove red blood cells from maternal blood, for example filtering. The processed sample is diluted into an isosmotic buffer composed of 8.5% glucose, 0.3% dextrose with conductivity between 10 μs/cm to 1.5 ms/cm. Then an appropriate dye is added into the solution, such as Giemsa dye. By controlling the volume of the dye and staining time, all the NRBC are stained but none of the maternal lymphocytes are stained. After staining, there is large difference between NRBC and maternal lymphocytes in both morphology and dielectric properties. The reason is that different cells or cell organelles absorb dyes with different efficiency. The result is that the difference in dielectric properties is amplified. Because the staining is processed in liquid, the ratio between Giemsa dye and buffer can be between 1:5 and 1:500. A typical value is about 1:10. If concentration of the dye is too high, it is hard to identify stained cells because of the intense color in solution. And all the cells, including NRBC and maternal lymphocytes are stained. If concentration of the dye is too low, some NRBC are not dyed and the separation result is not good. Time for staining is another critical parameter. If concentration of the dye is 1:100, the time for dying should be between 10 seconds to 10 minutes. If the time is too long, all the cells, including NRBC and maternal lymphocytes are stained. If the time is too short, some NRBC are not stained and the separation result is not good. After specific staining time, the sample is added into a dielectrophoresis chip. By applying an appropriate frequency and amplitude through a function generator, maternal lymphocytes are attracted to electrodes by positive dielectrophoresis force; while dying NRBC are repelled to the area with weakest electric field by negative dielectrophoresis force. Then NRBC can be collected by applying external pump. In NRBC collected, there is either fetal NRBC or maternal NRBC. After specific immunostaining for fetal hemoglobin, fetal NRBC can be distinguished from maternal NRBC by morphology (Cheung et al., Prenatal Diagnosis of Sickle Cell Anaemia and Thalassaemia by Analysis of Fetal Cells in Maternal Blood, *Nature Genetics,* 14:264–268 (1996)). By applying dielectrophoresis chip again, pure fetal NRBC can be obtained for further prenatal diagnosis.

Concentration of the dye and time for dying should be determined according to the characteristic properties of the dye and the cell types. Researcher of this field should know that cDEP chip, complex of cDEP and twDEP chip and particle manipulation chip can all be applied to separate maternal and fetal cells (WO 02/16647, PCT/US01/42426, PCT/US01/42280, and PCT/US01/29762). Then with the help of external pump, fetal cells can be collected. Because there are only very few fetal NRBC in maternal blood, dielectrophoresis separation are preferably applied twice or more to get pure fetal cells.

Giemsa dye can also be used to separate other types of cells with similar dielectric properties, such as red blood cells and white blood cells. If the concentration of dye is 1:100, the time for dying need to exceed 30 minutes. All white blood cells are stained but red blood cells are not stained because only nucleus can be stained by Giemsa dye and there is no nucleus in red blood cell. Then the sample is added into a dielectrophoresis chip. By applying a appropriate frequency and amplitude through a function generator, red blood cells are attracted to electrodes by positive dielectrophoresis force; while stained white blood cells are repelled to the area with weakest electric field by negative dielectrophoresis force. Then stained white blood cells can be collected by applying external pump.

Figure 4:
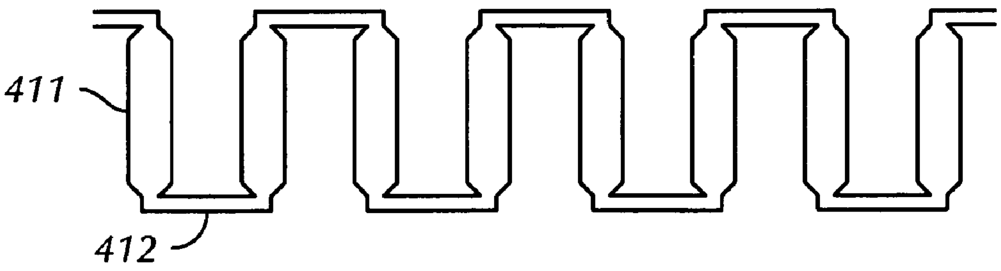
FIG. 4 illustrates the shapes of the channels on the gasket in the dielectrophoresis isolation device in FIG. 2.

An exemplary dielectrophoresis system is shown in FIG. 2. Tubing 1 is connected with the inlet of the valve 7; the outlet of valve 7 is connected with the inlet of cover slide 3 through tubing 8; and the outlet of cover slide 3 is connected with tubing 2 through tubing 9. The flow of buffer (container 13), sample (container 12), target sample (container 10) and waste liquid (container 11) is controlled by valves F1, F2, F3 and F4, respectively. Dielectrophoresis chip 5 and gasket 4 compose a reaction chamber where samples get separated. Voltage is applied to dielectrophoresis chips by signal generator 6. The thickness of gasket 4 is a critical value for separation. If it is too thick, the travel time of the cells is long, which in turn increases the separation time. If the gasket is too thin, the volume of reaction chamber is reduced, the separation time will also be increased. Appropriate height of gasket can lead to quick and efficient separation. To increase the effective range of dielectrophoresis field, the system can be designed as a 3-dimensional structure. The cover slide 3 is replaced by another dielectrophoresis chip 14 and two holes of inlet and outlet 141, 142 are formed by drilling and are connected by tubing 8 and 9. This structure will double the efficiency of the previous system. Because the range of dielectrophoresis is doubled, the thickness of gasket 4 can be increased two times, which leads to twice the volume of reaction chamber. The flow channel 41 in gasket 4 can be designed according to the structure of electrodes 51, 143 on the surface of dielectrophoresis chip 5, 14. As shown in FIG. 4, the channel is wider over the electrodes and thinner over the other area. This will reduce non-specific binding of cells to the surface without electrodes by decreasing channel cross-section area.

Figure 5A:
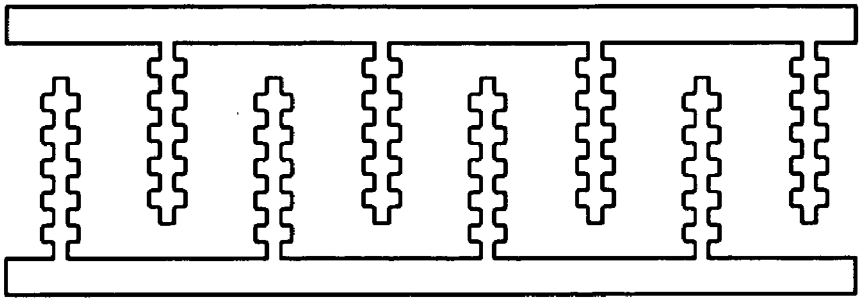
FIG. 5 illustrates the shapes of the electrodes on the dielectrophoresis chips in the dielectrophoresis isolation device in FIG. 2.
Figure 5B:
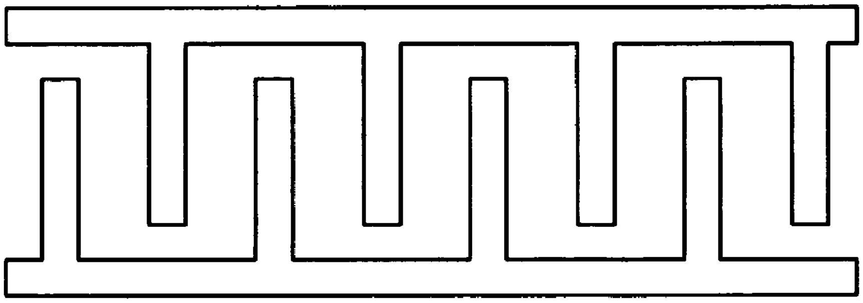
Figure 6:
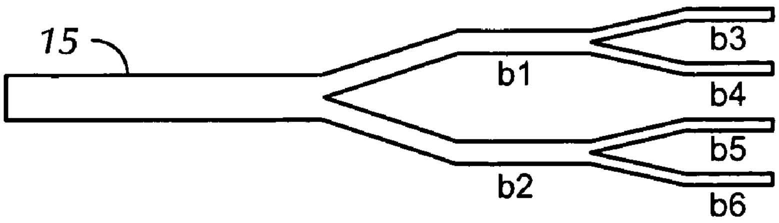
FIG. 6 illustrates an exemplary particle switch chip comprising multi-channel particle switches.

The shape of the electrodes 51 and 143 can be designed as shown in FIG. 5A and FIG. 5B. Flow channels of different dimensions and shapes can be designed according to the electrodes of different dimensions and shapes. Electrodes can be designed into other shapes as well.

Researchers in this field should know that cDEP chip, twDEP chip, particle manipulation chip or the combination of cDEP and twDEP chip can all be used to separate maternal and fetal cells. For example, a multiple cell manipulation switch can be designed according to the mechanism of traveling wave dielectrophoresis to realize separation of maternal red blood cells, maternal lymphocytes, maternal NRBC and fetal NRBC in parallel. An exemplary process is described below.

After dying with Giemsa dye, a sample is added into flow channel 15, in which maternal RBC and maternal lymphocytes are not stained while maternal and fetal NRBC are stained. When an appropriate voltage signal is applied, the latter two types of cells are collected at the branch b2 while the former two are collected at the branch b1. Then the maternal and fetal NRBC at branch b1 are stained by the immunoassay method specific for fetal hemoglobin. The dielectric difference between them is amplified, as well as morphology. Finally, maternal NRBC and fetal NRBC can be collected at branch b5 and b6 respectively by applying an appropriate voltage signal. And maternal RBC and maternal lymphocytes are collected at branch b3 and b4 respectively by applying an appropriate voltage signal (PCT/US01/42426, Wang et al, Dielectrophretic Manipulation of Cells with Spiral Electrodes, *Biophysical Journal,* 72:1887–1899 (1997); Hughes et al, Dielectrophretic Forces on Particles in Traveling Electric Fields, *J. Phys. Appl. Phys,* 29:474–482 (1997); and Muller, A 3-D Microelectrode System for Handling and Caging Single Cells and Particles, *Biosensors & Bioelectronics,* 14:247–256 (1999)). The dimension of the channel width is another critical value. The dimension can be in the same order as cells so that single cells can be manipulated with ease.

Before staining, the dielectric properties and morphology of maternal lymphocytes and fetal NRBC are very similar. So it is hard to separate them by dielectrophoresis. The difference in dielectric properties are amplified by staining because cells differ in their ability to absorb dyes. Researchers in this field should know that any appropriate method of staining can be applied to amplify the difference in dielectric properties between cells. Concentration and staining time of a particular dye are critical values for staining. With appropriate values, one kind of cells can be stained whereas other kind of cells is not stained. This leads to the amplification of their dielectric properties. There is a very important distinction between this method and conventional way of staining, in that the entire process disclosed here is operated in liquid. In conventional way of staining, cells are processed first in formide, methanol, ethanol or other organic solvents to get immobilized on glass slide. After washing with water and drying in the air, cells are stained with dyes. In this embodiment, some improvement has been made over conventional staining method. Under appropriate condition, one kind of cells is stained while others are not, which leads to the amplification of their dielectric properties. Then cells can be easily separated by dielectrophoresis chip. The result is a lot different from that of conventional methods. Other conventional stain methods that can be used include Giemsa stain, Wright stain, Wright-Giemsa Stain, Romannowsky stain and Kleihauser-Betke stain (Bianchi Diana, et al., Isolation of Fetal DNA from Nucleated Erythrocytes in Maternal Blood, *Proc. Natl. Acad. Sci. USA,* 86:3279–3283 (1990)).

An improved cell stain method has been applied to amplify the dielectric and morphology difference between maternal cells and fetal cells. Then with the help of various dielectrophoresis chips, fetal NRBC can be separated, enriched and purified. Finally, convention molecular biology methods are applied to fetal cells for quick, convenient and precise prenatal diagnosis.

The above examples are included for illustrative purposes only and are not intended to limit the scope of the invention. Many variations to those described above are possible. Since modifications and variations to the examples described above will be apparent to those of skill in this art, it is intended that this invention be limited only by the scope of the appended claims.

What is claimed is:

1. A method to separate red blood cells from white blood cells, which method comprises:

a) preparing a sample comprising red blood cells and white blood cells in a buffer;

b) selectively staining said white blood cells in said prepared sample with Giemsa dye so that there is a sufficient difference of dielectrophoretic property between Giemsa-dye-stained white blood cells and non-stained red blood cells; wherein the red blood cells and the white blood cells in the buffer have identical dielectrophoretic property or have insufficient difference in dielectrophoretic property to be separated by dielectrophoresis before staining; and c) separating said non-stained red blood cells from said Giemsa-dye-stained white blood cells via dielectrophoresis.

2. The method of claim 1, wherein said prepared sample is stained with Giemsa dye at a ratio of Giemsa dye to buffer ranging from about 1:5 (v/v) to about 1:500 (v/v).

3. The method of claim 1, wherein said prepared sample is stained for at least 30 minutes.

4. The method of claim 1, wherein the separation is conducted in a chip format.

5. The method of claim 4, wherein the non-stained red blood cells are subjected to positive dielectrophoresis and are captured on an electrode of the chip and the Giemsa-dye-stained white blood cells are subjected to negative dielectrophoresis and are repulsed to a place where electrical field is the weakest.

6. The method of claim 4, further comprising collecting the Giemsa-dye-stained white blood cells from the chip.

7. The method of claim 6, wherein the Giemsa-dye-stained white blood cells are collected from the chip via an external pump.

* * * * *